US009998332B2

(12) United States Patent
Baran et al.

(10) Patent No.: US 9,998,332 B2
(45) Date of Patent: Jun. 12, 2018

(54) SIGNAL-FLOW ARCHITECTURE FOR COOPERATIVE CONTROL AND RESOURCE ALLOCATION (71) Applicant: Massachusetts Institute of Technology, Cambridge, MA (US)

(72) Inventors: Thomas A. Baran, Somerville, MA (US); Alan V. Oppenheim, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 368 days.

(21) Appl. No.: 14/541,683

(22) Filed: Nov. 14, 2014

(65) Prior Publication Data

US 2015/0142966 A1 May 21, 2015

Related U.S. Application Data (60) Provisional application No. 61/904,587, filed on Nov. 15, 2013.

(51) Int. Cl.
*G06F 15/173* (2006.01)
*H04L 12/24* (2006.01)
*H04L 12/26* (2006.01)
*H04L 12/911* (2013.01)
*G06F 9/50* (2006.01)

(52) U.S. Cl.
CPC ........ *H04L 41/0826* (2013.01); *G06F 9/5083* (2013.01); *H04L 43/0876* (2013.01); *H04L 47/72* (2013.01)

(58) Field of Classification Search
None
See application file for complete search history.

(56) References Cited

U.S. PATENT DOCUMENTS

| 5,325,518 | A | 6/1994 | Bianchini, Jr. |
| 6,667,957 | B1 | 12/2003 | Corson et al. |
| 6,751,455 | B1 * | 6/2004 | Acampora ............ H04L 45/122 370/338 |
| 6,882,988 | B2 | 4/2005 | Subbu et al. |
| 7,356,187 | B2 | 4/2008 | Shanahan et al. |
| 7,460,543 | B2 | 12/2008 | Malik et al. |

(Continued)

FOREIGN PATENT DOCUMENTS

WO WO-2012140152 A1 10/2012

OTHER PUBLICATIONS

Eager, D.L., et al., (May 1986) "Adaptive Load Sharing in Homogeneous Distributed Systems", *IEEE Transactions on Software Engineering*, vol. 12, No. 5, pp. 662-675.

(Continued)

*Primary Examiner* — Hamza N Algibhah
*Assistant Examiner* — Gregory P Tolchinsky
(74) *Attorney, Agent, or Firm* — Goodwin Procter LLP (57) ABSTRACT Methods and supporting systems for allocating a resource among multiple agents are disclosed. Multipoint-to-multipoint communication is established among the agents, with each agent using an amount of a resource. A first agent receives information associated with the resource usage of a second agent and determines the difference in resource usage between itself and the second agent. Based in part on the resource usage difference, the first agent is controlled to modify its use of the resource.

30 Claims, 5 Drawing Sheets

(56) References Cited

U.S. PATENT DOCUMENTS

| | | | |
|---|---|---|---|
| 7,822,695 B2 | 10/2010 | Solomon | |
| 7,823,154 B2 | 10/2010 | Wang et al. | |
| 8,090,814 B2 | 1/2012 | Arroyo et al. | |
| 8,233,490 B2 | 7/2012 | Hundscheidt et al. | |
| 8,396,655 B2 | 3/2013 | Breuer et al. | |
| 8,453,163 B2 | 5/2013 | Kothamasu et al. | |
| 8,593,968 B2 | 11/2013 | Santiago et al. | |
| 8,744,661 B2 | 6/2014 | Horn | |
| 2003/0065774 A1* | 4/2003 | Steiner | H04L 67/16 709/225 |
| 2009/0122706 A1* | 5/2009 | Alfano | H04L 41/046 370/237 |
| 2010/0106356 A1 | 4/2010 | Trepagnier et al. | |
| 2011/0093177 A1 | 4/2011 | Horn | |
| 2011/0167039 A1* | 7/2011 | Kol | G06F 11/3433 707/633 |
| 2012/0043923 A1 | 2/2012 | Ikriannikov et al. | |
| 2013/0017796 A1 | 1/2013 | Milner et al. | |
| 2013/0281108 A1 | 10/2013 | Silva et al. | |

OTHER PUBLICATIONS

Park, V., et al., (Apr. 1997) "A Highly Adaptive Distributed Routing Algorithm for Mobile Wireless Networks", *Proceedings IEEE*, vol. 3, pp. 1405-1413.

Baran, T. (2012) "Conservation in Signal Processing Systems," Thesis submitted to the Department of Electrical Engineering and Computer Science at Massachusetts Institute of Technology, 214 pages.

Baran, T., et al. (May 2013) "A Robust Signal-Flow Architecture for Cooperative Vehicle Density Control," Massachusetts Institute of Technology, ICASSP, pp. 2790-2794.

\* cited by examiner

SIGNAL-FLOW ARCHITECTURE FOR COOPERATIVE CONTROL AND RESOURCE ALLOCATION

CROSS-REFERENCE TO RELATED APPLICATIONS

This application claims priority to and the benefit of U.S. Provisional Patent Application No. 61/904,587, filed Nov. 15, 2013, and entitled "Signal-Flow Architecture for Cooperative Control and Resource Allocation," the entirety of which is incorporated by reference herein.

TECHNICAL FIELD

The present disclosure relates generally to resource allocation and, more specifically, to systems and methods for providing a signal-flow architecture in which resources are allocated among multiple agents that communicate in a decentralized manner.

BACKGROUND

In physical systems that are assembled as a lossless interconnection of physical subsystems, the total power consumed or produced by the interconnection is zero, i.e., power is conserved. A lossless physical interconnection of K subsystems, each with conjugate effort and flow variables denoted $e_k$ and $f_k$, respectively, therefore has a conservation law that may be written as the equation, $e_1 f_1 + \ldots + e_K f_K = 0$. In such physical systems, this equation holds independent of whether the interconnected subsystems are linear or nonlinear, time-invariant or time-varying, or deterministic or stochastic. As such, the use of the conservation equation in the derivation of useful mathematical theorems about physical systems often implies not only that the theorems apply very broadly, but also that the application of linear or nonlinear transformations may be used as a tool in the corresponding derivations.

One may look to electrical networks to find a broad class of such theorems originating from equations of the form of the conservation equation. In this class of physical systems, the equation is embodied by Tellegen's Theorem, and a comprehensive summary of many of the accompanying theorems, which address among other things stability, sensitivity, and variational principles in electrical networks, can be found in *Tellegen's Theorem and Electrical Networks* (Penfield, Spence and Duinker, The MIT Press, Cambridge, Mass., 1970).

In contrast to physical systems, many current signal processing architectures, including general-purpose computers and digital signal processors, implement algorithms in a way that is often far-removed from the physics underlying their implementation. One advantage to this is that a wide range of signal processing algorithms can be realized that might otherwise be difficult or impossible to implement directly in discrete physical devices, including for example transform-based coding, cepstral processing, and adaptive filtering. However, the high degree of generality facilitated by these types of architectures comes with the expense of losing some of the powerful analytic tools traditionally applied in the design and analysis of the restricted set of systems that is allowed physically, and derivations of many of these tools stem from equations of the form of the conservation equation.

A common strategy to overcome this essentially involves designing signal processing algorithms that mimic the equations or sets of equations describing a specific physical system or class of physical systems. Any signal processing algorithm that can be put in the form of the equations is then regarded as being of a special class, to which a wide range of theorems often apply. For example, the class of signal processing systems consisting of two subsystems interconnected to form a feedback loop is a canonical representation into which it is often desirable to place control systems, and about which many useful results are known. This strategy has also been used with respect to the wave-digital class of structures as well as network-based optimization algorithms. Indeed, conservation principles are at work in a wide class of useful systems and algorithms.

SUMMARY

Systems and methods for allocating a resource among a plurality of agents are disclosed. In one aspect, multipoint-to-multipoint communication is established among multiple agents, where each agent uses an amount of a resource. A first agent receives information associated with the resource usage of a second agent, and determines the difference in resource usage between the first and second agents. Further, the first agent is controlled to modify its use of the resource based at least in part on the difference in resource usage between the first and second agents.

Each agent can include a controller for managing resource usage and a transmitter/receiver for communicating with other agents, and the multipoint-to-multipoint communication can be achieved using wireless connections. In some instances, the agents do not communicate globally with each other.

In one implementation, each agent is able to determine a difference in resource usage between itself and each other agent with which it communicates. In other implementations, each agent is also able to determine an overall usage of the resource. The resource usages of some agents can be subject to respective constraints. The resource can be, for example, physical space, energy consumption, temperature, pressure, or communications bandwidth.

In another implementation, the information associated with the resource usage of the second agent includes an output of a control function applied to a difference in resource usage between the second and first agents. The control function can be a generally nonlinear function.

If the resource usage of the first agent is limited to a constraint, the first agent can be controlled to use an amount of the resource equal to the constraint. If, on the other hand, the resource usage of the first agent is not limited to a constraint, the first agent can be controlled to increase or decrease the amount of the resource used by the first agent.

In a further implementation, the first agent communicates to the second agent information associated with the resource usage of the first agent, and the second agent can be controlled to modify its use of the resource based at least in part on the difference in resource usage between the first and second agents.

In yet another implementation, the first agent receives information associated with the resource usage of a third agent in the plurality of agents, determines the difference in resource usage between the first and third agents, and is controlled to modify its use of the resource based on the difference in resource usage between the first and second agents and the difference in resource usage between the first and third agents.

The use of the resource by the agents can locally minimize a cost function comprising:

$$\min_{x_1,\ldots,x_N} F_0\left(\sum_{k=1}^{N} x_k\right) + \sum_{(j,k)\in\mathcal{B}} F_{jk}(x_j - x_k)$$

where $x_j$ is the resource usage of a particular agent j, where $x_k$ is the resource usage of a particular agent k, where N is the number of agents, where B is a set of pairs of agents (j, k) in communication with each other, and where $F_{jk}(X)$ and $F_0(x)$ are penalty functions.

Other aspects of the invention include supporting systems. The various aspects and advantages of the invention will become apparent from the following drawings, detailed description, and claims, all of which illustrate the principles of the invention, by way of example only.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, emphasis instead generally being placed upon illustrating the principles of the invention.

DETAILED DESCRIPTION

Conservation principles play a key role in the development and analysis of many existing engineering systems and algorithms. In electrical network theory for example, many of the useful theorems regarding the stability, robustness, and variational properties of circuits can be derived in terms of Tellegen's theorem, which states that a wide range of quantities, including power, are conserved. Conservation principles also lay the groundwork for a number of results related to control theory, algorithms for optimization, and efficient filter implementations. Arising from these principles is a signal processing framework that has applications related to linear and nonlinear signal-flow graph analysis, robust filter architectures, and distributed control algorithms.

Accordingly, described herein is a system architecture and corresponding methods that facilitate the allocation of a resource among a set of agents in a way that is decentralized, that does not require global communication between all agents, that is robust to measurement errors, and that has attractive stability properties. The resource being allocated can be any of a number of quantities, including but not limited to physical space, communications bandwidth, energy consumption, temperature, and pressure.

Figure 1:
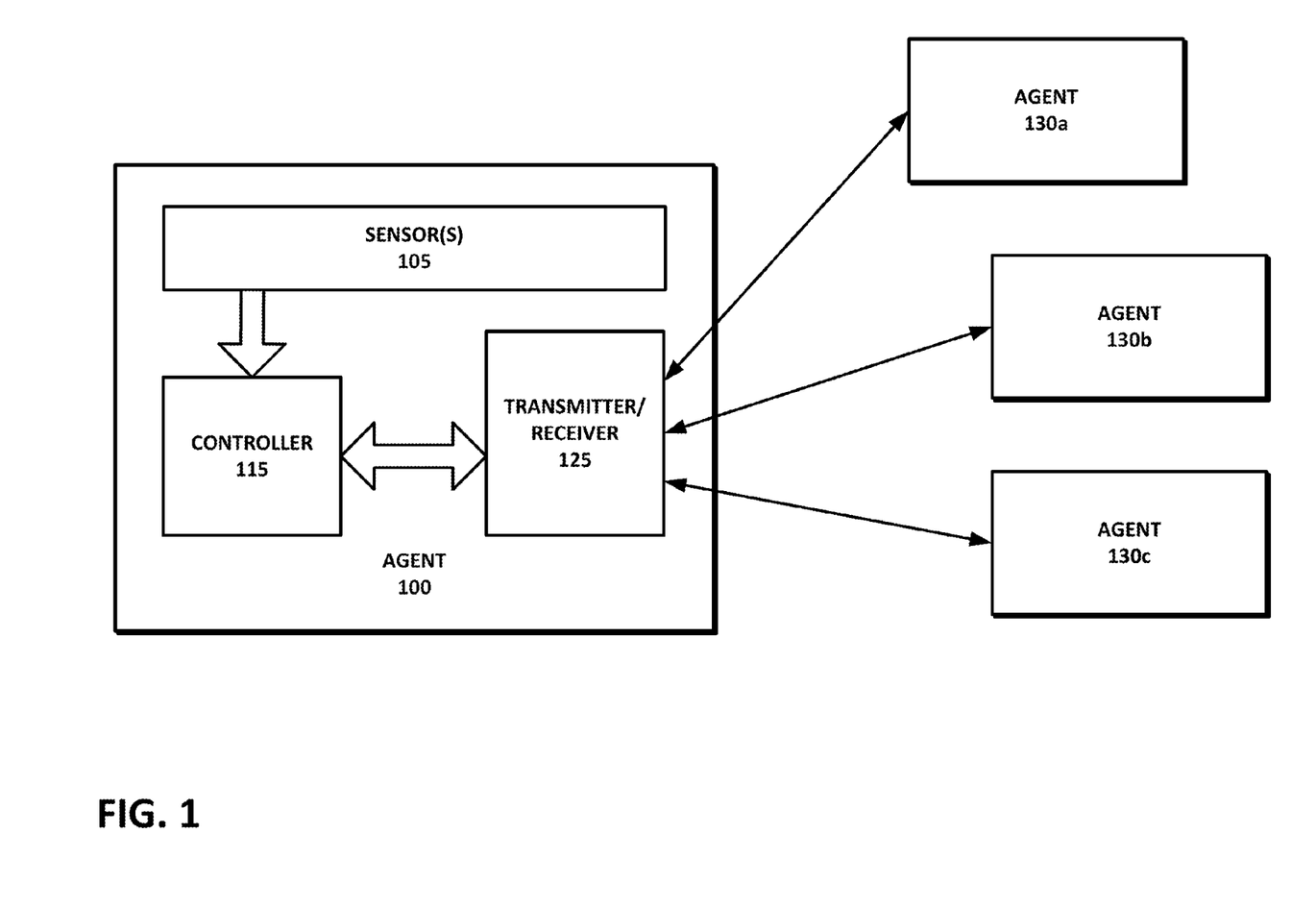
FIG. 1 is a diagram depicting the components of an agent in communication with other agents according to an implementation.

Referring to FIG. 1, a particular agent 100 can be a controllable machine, mechanism, function, circuit, network, or other system that is capable of using a resource. In some implementations, an agent 100 can receive information from one or more other agents 130a-130c that the agent 100 is in communication with, directly or indirectly, and/or can receive information from other internal or external sensors 105, connections, or other inputs. Further, the agent 100 can use such received information to guide its operation with respect to resource usage. Examples of agents include, but are not limited to, robotic devices, computers, networking devices, temperature controllers, pressure controllers, and partially or fully autonomous vehicles.

In one implementation, one or more agents 100 each have a controller 115 that receives input and, based on the input, provides output to direct the operation of the agent 100. The controller 115 can be implemented, for example, using one or more programmable processors that execute instructions stored on a memory. Processors suitable for the execution of a program include, by way of example, both general and special purpose microprocessors, and any one or more processors of any kind of digital computer. Generally, a processor receives instructions and data from a read-only memory or a random access memory or both. Information carriers suitable for embodying instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. In other instances, the controller can be implemented entirely or in part as special purpose logic circuitry, e.g., an FPGA (field programmable gate array) or an ASIC (application-specific integrated circuit).

The agent 100 can include one or more sensors 105 or other input devices that capture or receive data, which can be processed and provided as input to the controller 115. Captured data can relate to the operation of the agent 100 and/or other agents 130a-130c with respect to the usage of a resource, and can include measurements of, for example, position, distance, velocity, temperature, pressure, sound, bandwidth, and other values as applicable to the measurement of a particular resource. Sensors 105 can include visual sensors (e.g., image/video cameras), infrared and heat sensors, temperature and pressure sensors, global positioning systems (GPS), accelerometers, compasses, ultrasonic and sonar positioning sensors, photodetectors and laser ranging devices, microphones, network measurement devices, and so on.

The agent 100 can also include a transmitter and/or receiver 125 to transmit information to and/or receive information from other agents 130a-130c (e.g., an agent can transmit a control signal to and receive a control signal from each other agent with which it communicates). The transmitter and/or receiver 125 can include various radios and radio antennas, speakers and microphones, or other communication devices. In general, communication among agents can be established using known techniques and mechanisms. For example, communication can occur over wireless links (e.g., 802.11 (Wi-Fi), Bluetooth, GSM, CDMA, LTE, 3G etc.), LAN or WAN links (e.g., T1, T3, 56 kb, X.25), broadband connections (ISDN, Frame Relay, ATM), and/or standard telephone lines. Other communication media are contemplated. Messages between agents can be carried using, for example, TCP, UDP, or other known or custom communication protocols.

In various implementations, agents communicate with each other directly and/or indirectly, on a continuous and/or intermittent basis. Agents can communicate with each other in relationships that are point-to-point (i.e., single agent to single agent), point-to-multipoint (i.e., single agent to multiple agents), multipoint-to-point (i.e., multiple agents to single agent), and/or multipoint-to-multipoint (i.e., multiple agents to multiple agents). Notably, however, to achieve the benefits described herein, it is not necessary that all agents to communicate globally with each other (i.e., a centralized channel for communication is not required). In some implementations, communication among agents is implicit such that, instead of explicitly transmitting information to or receiving information from another agent, an agent "communicates" with that other agent by observing its behavior. For example, in the case where the resource being allocated is physical space, an agent can receive information about another agent's resource usage by observing (e.g., using visual or other sensors) the movement of the other agent about the physical space.

Information received by the agent 100 from other agents 130a-130c and/or through the sensors 105 of the agent 100 itself can be provided as input to the controller 115, which can produce, as output, data that can be provided to other agents 130a-130c and/or can be used to direct the operation of the agent 100 and the use of a particular resource. For example, an airborne drone (agent) in a swarm of drones (agents) can have propulsion and directional/navigation systems that can be directed by the controller 115. Given certain inputs, the controller 115 may determine that the drone should increase its distance with respect to another drone with which it communicates and, as such, provide an output signal that causes the rudder of the drone to produce the desired outcome. One will appreciate the numerous control outputs that can be provided by the controller 115, depending on the capabilities of the agent. Such outputs can operate physical and electronic mechanisms including, but not limited to, underwater vehicle propulsion systems, propellers, rotors, rudders and engines in aircraft, drivetrains in terrestrial vehicles, actuators to control pressure valves, thermostat circuits, and so on.

In one implementation, the specific aim of a system implemented using the rules of the present architecture is to allocate resources in a way that tends toward an overall local minimum of a particular cost function, where the cost function is written in terms of resource usage differences between certain pairs of agents. Denoting the number of agents using N and the resource usage for a specific agent as $x_k$, k=1, ..., N, any such system will tend toward a local minimum of the following constrained minimization:

$$\min_{x_1,...,x_N} F_0\left(\sum_{k=1}^{N} x_k\right) + \sum_{(j,k)\in B} F_{jk}(x_j - x_k) \quad (1)$$

$$s.t. \quad x_k = c_k, k \in C$$

Eq. 1 represents a total sum of penalty functions, in which B refers to the set of pairs of indices corresponding to pairs of agents that have resource usage differences that enter in the cost function, with the functions $F_{jk}(x)$, $(j, k) \in B$ being the associated penalty functions. That is, $F_{jk}(x)$ is a penalty function applied to the resource usage differences between communicating pairs of agents (i.e., resource usage of agent j ($x_j$) less the resource usage of agent k ($x_k$)). In practice, this penalty function can be used to "punish" agents that use too much or too little of a particular resource. In other words, in minimizing the cost function in Eq. 1, the behavior of the system is consequently influenced to minimize such penalties.

In one example, $F_{jk}(x)$ is constructed to penalize an individual aircraft in a swarm of drones that drifts too far from another drone with which it is in communication. For purposes of illustration only, a penalty function for an instrumental aerial or underwater vehicle can be constructed to cause the vehicle to maintain one of two distances to improve the diversity of gathered measurements: a "near" distance resulting in platoon travel, or a "far" distance for operating in a more exploratory mode:

$$F_{jk}(x) = (1 - e^{-(x-d_{desired,near})^2})(x - d_{desired,far})^2 \quad (1.1)$$

In another example, a penalty function for a system of room thermostats designed to result in a uniform temperature among rooms is $F_{jk}(x)=x^2$. In yet another example, $F_{jk}(x)$ penalizes a radio in a wireless ad hoc network that allocates or uses too much shared bandwidth as compared to its neighbors.

The function $F_0(x)$, on the other hand, is a penalty function that applies to the overall resource usage of the system (i.e., the sum of the resource usage of each agent ($x_k$)). More specifically, the inclusion of $F_0(x)$ in the Eq. 1 cost function provides for the minimization of a behavior having an undesirable effect on the total resource usage. For example, referring again to the wireless ad hoc network, $F_0(x)$ can be constructed to penalize a high allocation or usage of bandwidth totaled among all radios in the network, thereby influencing a lower combined allocation or usage (by virtue of the minimization of the cost function). In one specific non-limiting example, such a penalty function designed to penalize total bandwidth usage beyond $B_l$ is $F_0(x)=\max(x-B_l, 0)^{1.5}$. In some implementations, there are no specific requirements on the functions $F_{jk}(x)$ and $F_0(x)$ aside from being differentiable, i.e., continuous in x. Moreover, $F_{jk}(x)$ and $F_0(x)$ can be linear or nonlinear functions.

In Eq. 1, the index set C corresponds to the set of agents whose resource usages $x_k$ are constrained to be specific values, denoted $c_k$. In one example, a particular vehicle in a swarm of autonomous underwater vehicles is constrained with respect to usage of the resource of physical space and, thus, remains in a fixed position relative to other vehicles in the swarm. In various implementations, none, some, or all agents are associated with resource usages that are constrained to specific values.

Without loss of generality, it can be assumed in the description of the system that there is symmetry in the set B, i.e., $$(j,k) \in B \Longleftrightarrow (k,j) \in B \quad (2)$$

This assumption is not restrictive because the functions $F_{jk}(x)$ and $F_{kj}(x)$ are not required to have any specific relationship. For example, it is possible to set $F_{kj}(x)=0$ if no such function is specified explicitly. Any two agents j and k for which $(j, k) \in B$ are referred to herein as being "joined," or in communication. Communication methods can include those as described above.

The presented architecture is specified from the perspective of a continuous-time system implemented within each agent. In one implementation, a particular agent j controls its own resource usage and is able to measure resource usage differences with respect to other agents. More specifically, an agent j can have output control of its own resource usage, with the time evolution of this quantity represented by the signal $x_j(t)$. Control of the resource usage of an agent can be as described herein; for example, a controller of the agent can direct physical components or software modules of the agent to operate in a specific manner to produce the desired effect on resource usage. Further, as noted, agent j can measure the difference in resource usage between itself and other agents to which it is joined. That is, agent j is able to measure the quantities $$d_{jk}(t) = x_j(t) - x_k(t), \; (j,k) \in B \quad (3)$$

where $x_j(t)$ and $x_k(t)$ are the time evolutions of the resource usage of agent j and an agent k to which agent j is joined, respectively.

In further implementations, agent j is able to measure the overall resource usage of all agents, written as $$s(t) = \sum_{k=1}^{N} x_k(t) \quad (4)$$

The overall resource usage, (s(t)), can be determined by an individual agent based on information (e.g., individual agent or group resource usages) communicated to the agent directly or indirectly from other agents. In some instances, the overall resource usage is a value known to some or all agents as an inherent function of the system. For example, in the case of bandwidth allocation among multiple radio agents, the total resource (bandwidth) usage may be available to each agent without the need to identify and sum the individual usages of each agent. Of note, the use of overall resource usage as a parameter to $F_0(x)$ in Eq. 1 allows for the individual agents and, ultimately, the system to adapt its behavior based on such usage.

Figure 2:
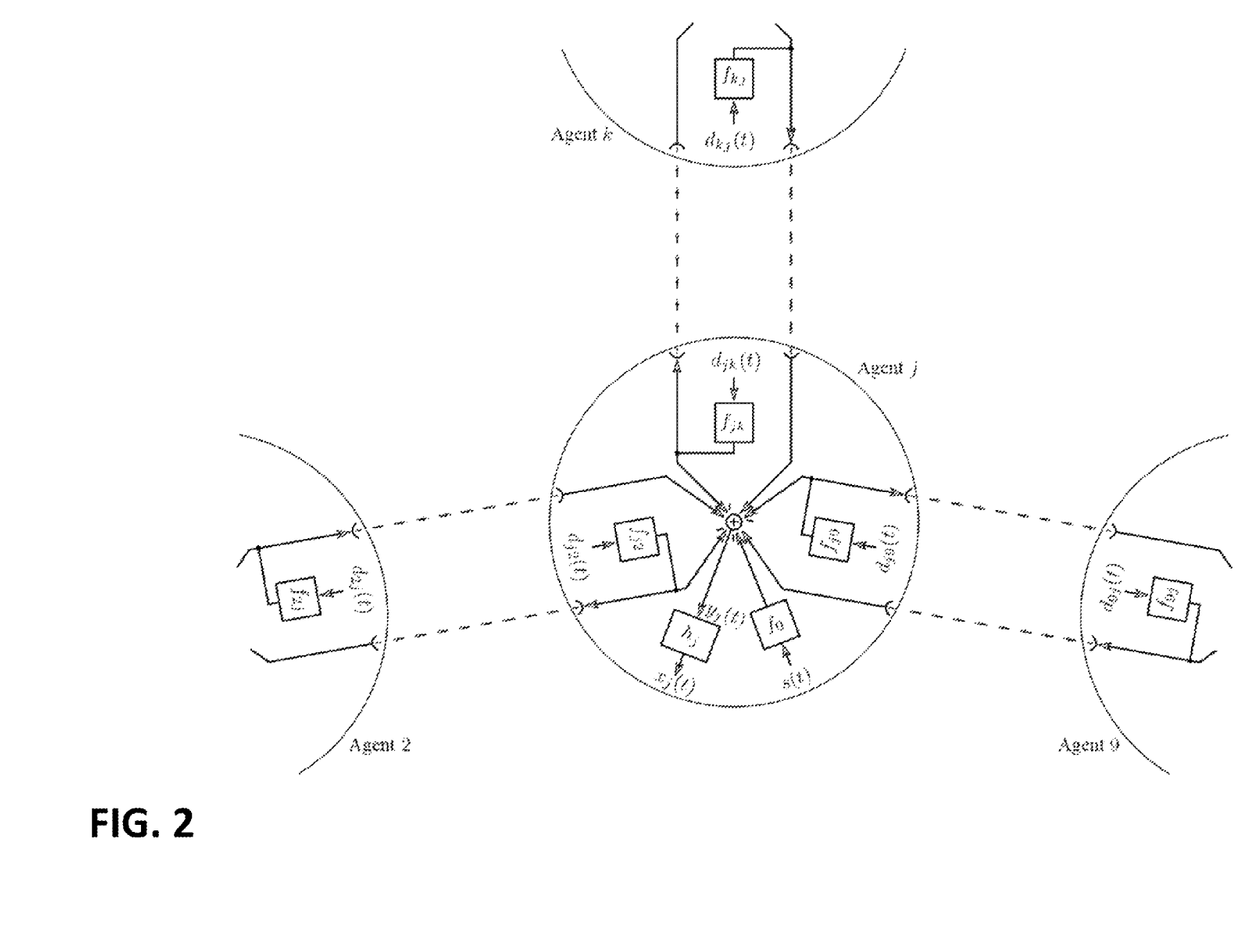
FIG. 2 is a diagram of multiple agents in communication according to an implementation of the present architecture.

Using the notation described herein, the presented architecture is depicted in FIG. 2. In the depicted example, three agents k, 2, and 9 are in communication with agent j, as represented by the dashed lines (i.e., (j, k), (j, 9), (j, 2)∈B). Referring to this figure, the control functions $f_{jk}(x)$ can be memoryless nonlinearities that are related to the terms in the cost function (Eq. 1) according to $$F_{jk}(x) = \int f_{jk}(\tau) d\tau \quad (5)$$

Likewise, the function $f_0(x)$ in FIG. 2 can be a memoryless nonlinearity that satisfies $$F_0 = \int f_0(\tau) d\tau \quad (6)$$

The lower limit of integration in each of Eqns. 5 and 6 is arbitrary, contributing to an additive constant in the associated cost term in Eq. 1; i.e., the lower limits of integration do not affect the values of the variables $x_k$ for which Eq. 1 is minimized.

Agent j is able to measure the difference in resource usage $d_{jk}(t)$ between itself and each agent k with which it communicates, and each difference serves as a parameter of the corresponding control function $f_{jk}(x)$. More specifically, as depicted, the resource usage difference $d_{j2}(t)$ between agent j and agent 2 is input to control function $f_{j2}(x)$, the resource usage difference $d_{j9}(t)$ between agent j and agent 9 is input to control function $f_{j9}(x)$, and the resource usage difference $d_{jk}(t)$ between agent j and agent k is input to control function $f_{jk}(x)$. Likewise, each of agents k, 2, and 9 is able to measure the resource usage difference between itself and agent j ($d_{kj}(t)$, $d_{2j}(t)$, and $d_{9j}(t)$, respectively) and use such measured difference as input to its control function ($f_{kj}(x)$, $f_{2j}(x)$, and $f_{9j}(x)$, respectively). If the overall resource usage s(t) is available to an agent, the usage s(t) can be input to the control function $f_0(x)$.

The result of a control function measuring the resource usage difference between two agents can be communicated from each agent to the other. For example, as shown, the output of $f_{jk}(x)$ can be provided by agent j to agent k, and the output of $f_{kj}(x)$ can be provided by agent k to agent j (e.g., via wireless links). In other implementations, the value of the resource usage difference itself can be communicated between joined agents.

In one implementation, to obtain control input signal $y_j(t)$, the agent j sums the results of its local control functions $f_{jk}(x)$ that are obtained by processing the corresponding direct measurements $d_{jk}$ (in FIG. 2, this is $f_{jk}(x)$, $f_{j2}(x)$, and $f_{j9}(x)$) and subtracts the sum of the outputs of the control functions $f_{kj}(x)$ that are communicated to agent j from all agents in communication (in FIG. 2, this is $f_{kj}(x)$, $f_{2j}(x)$, and $f_{9j}(x)$ from joined agents k, 2 and 9, respectively). In some instances, $y_j(t)$ also accounts for the results of control function $f_0(x)$. The resulting signal $y_j(t)$, which serves as the control input to subsystem $h_j$ (further described below) can be thought as representing a command indicating which direction the resource usage should be changed (e.g., increased or decreased). Consequently, $h_j$ operates to implement the change in resource usage as a function of what is specified by $y_j(t)$.

In the depicted implementation, each agent j, k, 2, 9 contains a subsystem denoted $h_j$ (not shown in agents k, 2, and 9), and each such subsystem has one of two effects on the signals $y_j(t)$ (input) and $x_j(t)$ (output) to which it is connected, depending on whether the associated resources $x_j$ are constraints (i.e., depending on whether j∈C). Accordingly, if j∈C, $h_j$ is a subsystem that results in:

$$x_j(t) = c_j \quad (7)$$

That is, if the resource usage of the agent j is limited to a constraint $c_j$, the resource usage output signal $x_j(t)$ is set equal to the constraint $c_j$.

If, on the other hand, j∉C, the $h_j$ is a subsystem that results in the following relationship between the respective input and output signals $y_j(t)$ and $x_j(t)$:

$$\text{sign}\left(\frac{dx_j(t)}{dt}\right) = \text{sign}(y_j(t)), \; \forall \, t \quad (8)$$

That is, the sign (positive or negative) of the input signal should be the same as the sign of the change in the resource usage output signal. For example, in the case of a set of thermostats regulating the temperature of various areas of a building, a particular thermostat j can have a subsystem, $h_j$, that receives a control input signal $y_j(t)$ and outputs a target resource usage $x_j(t)$. If the input signal $y_j(t)$ is indicative of a need to increase the temperature of the area controlled by the thermostat j, the change in resource usage $x_j(t)$, in accordance with Eq. 8, should be positive as well. Likewise, a need to decrease the temperature should result in a negative change in the output resource usage signal $x_j(t)$. Thus, the principle described in Eq. 8, in combination with the previously-mentioned topology and conservation principle, provides for an inherent stability in the behavior of the system.

Advantageously, the subsystem $h_j$ can the same in each agent or can be unique to individual agents to account for, e.g., differing characteristics in particular agents. For example, one drone agent in a swarm may have a greater mass and require additional thrust to increase its airspeed as compared to other drones in the swarm. As such, the subsystem $h_j$ in that drone can be constructed to account for the physical configuration of the drone in determining an appropriate target output resource usage $x_j(t)$ from input signal $y_j(t)$. In some implementations, the target output resource usage $x_j(t)$ of one agent is observable to other agents (i.e., implicit communication of the target resource usage to the other agents) whereas, in other implementations, the output resource usage $x_j(t)$ of one agent is explicitly communicated to one or more other agents or is generally available to one or more other agents. Regardless of how obtained, one agent can use the output resource usage $x_j(t)$ of another agent in determining a difference in resource usages between itself and the other agent.

Figure 3:
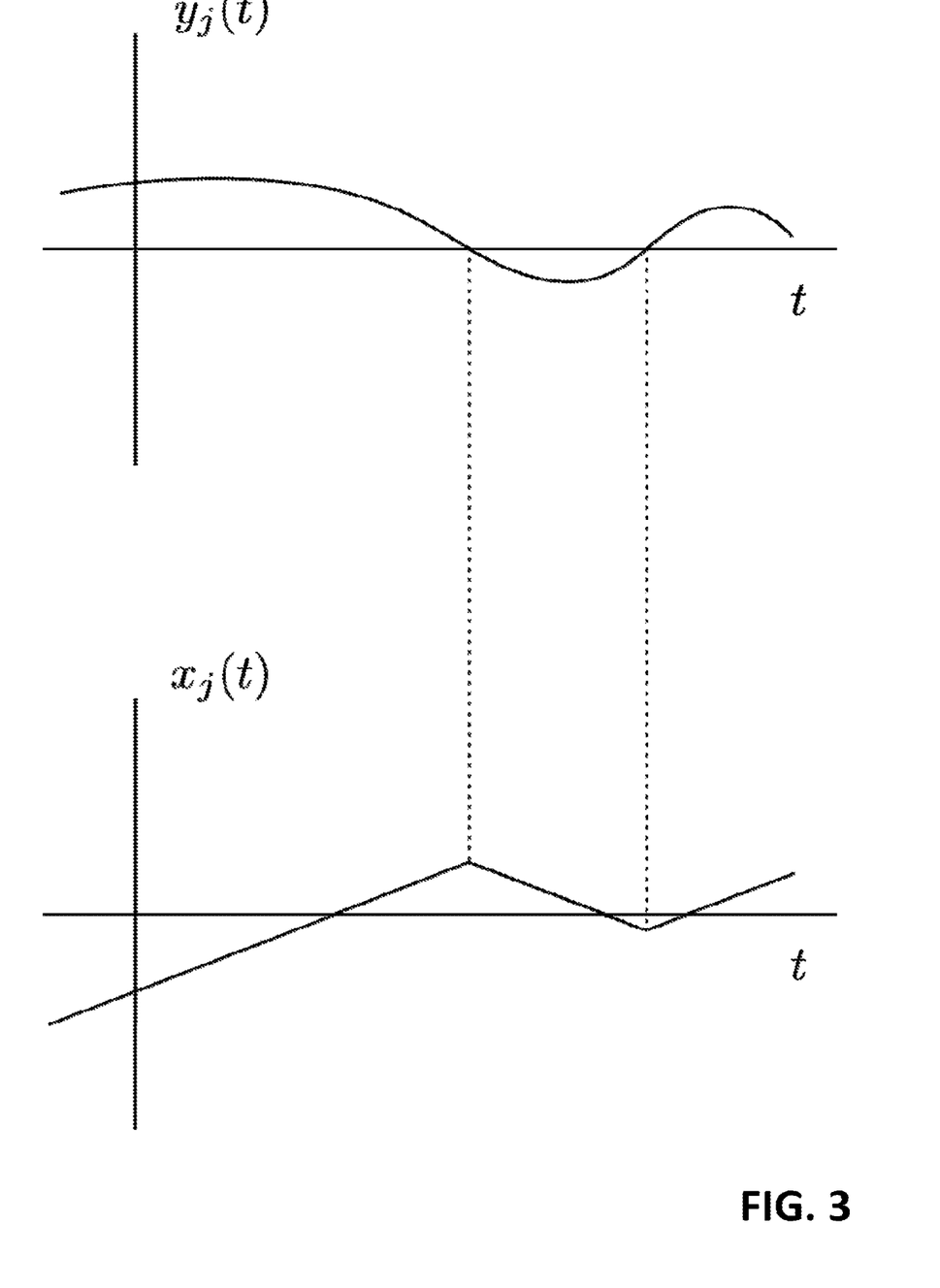
FIG. 3 depicts graphs of an input signal and resulting output signal according to an example subsystem $h_j$.

To illustrate, in one non-limiting example, $h_j(x(t))=\int_{-\infty}^{t} \text{sign}(x(\tau))d\tau$, where $\text{sign}(x(\tau))$ is +1 if $x(\tau)>0$, is −1 if $x(\tau)<0$, and is 0 if $x(\tau)=0$. The input signal $y_j(t)$ shown in the top graph in FIG. 3, provided as input to the above subsystem $h_j$, would then result in the output signal $x_j(t)$ shown in the bottom graph of FIG. 3.

Figure 4:
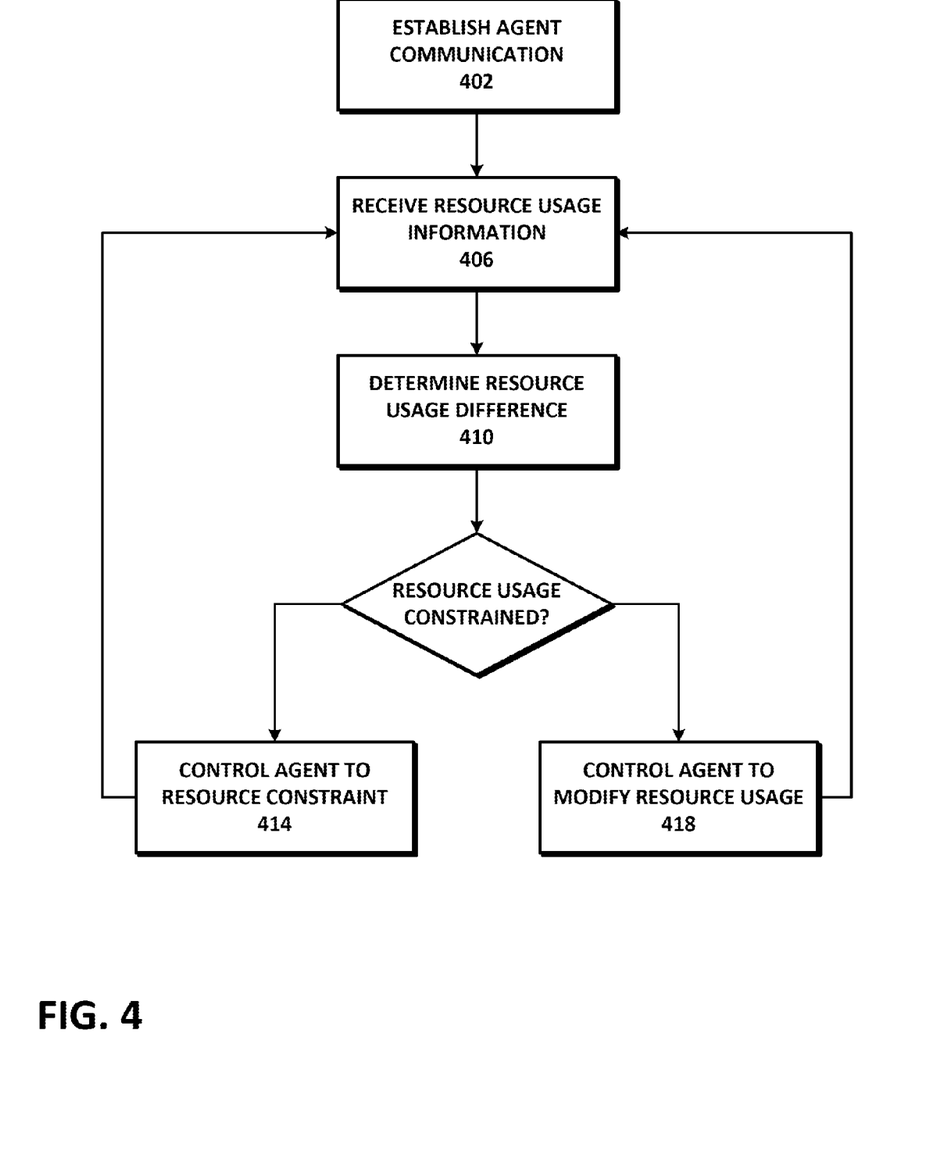
FIG. 4 is a flowchart of an example method for allocating a resource among agents.

FIG. 4 illustrates an example method for allocating a resource among multiple agents. In STEP 402, communication is established among two or more agents, for example, in a manner such as that described herein. In the case of three or more agents, multipoint-to-multipoint communication can exist. Each agent uses an amount of a particular resource. For example, for quantifiable resources, an agent can use none, some, or all of the resource.

Information associated with the resource usage of an agent can be provided, explicitly or implicitly via measurement of a shared quantity, to other agents with which the agent communicates. Likewise, the agent can receive, from those other agents, information associated with their individual resource usages (STEP 406). In one implementation, the resource usage information provided from one agent to another is the output of a control function applied to the difference in resource usages between the two agents. The control function can be, for example, a nonlinear function.

In STEP 410, the agent determines the difference in resource usage between itself and one or more other agents with which it communicates. As earlier described, these resource usage differences can be used as input to penalty functions as part of a cost function to be minimized (see, e.g., Eq. 1). Based on these resource usage differences, the agent is controlled to modify its use of the resource. In the case where the resource usage of the agent is subject to a constraint, the agent can be controlled to use an amount of the resource equivalent to the constraint (STEP 414). If, on the other hand, the resource usage of the agent is not subject to a constraint, the agent can be controlled to modify its use of the resource such that there is an increase, decrease, or no change in the current resource usage of the agent (STEP 418). As described above, the change in resource usage can be determined using a subsystem associated with the particular agent, where the subsystem produces the resource usage output signal based on the processing of resource usage differences between communicating agents.

The agent can continue to operate in the network of agents, continuously reevaluating its resource usage and the resource usages of other agents, and controlling its own operation based thereon. It should be noted that these steps can be performed continuously and serially or in parallel depending on available data, and agents can enter into and exit communication with each other from time to time depending on the nature of the system. For example, individual thermostats in fixed locations of a building will generally maintain communication links with a constant set of other thermostats in the building, whereas as each drone in a swarm of drones moving independently of each other may have a continuously changing set of drones with which it communicates.

It is to be appreciated that there are a substantial number of applications for the techniques disclosed herein. In one non-limiting example, shown in FIG. 5, a system of autonomous underwater vehicles can engage in multipoint-to-multipoint communication. In this instance, the allocated resource is the position of a particular vehicle, and the resource usage difference measurements correspond to distance measurements between nearby vehicles. As shown, the pairs of vehicles in communication are {(A, B), (A, C), (B, C), (B, D), (C, D), (D, E)}. It should be noted, however, that as the vehicles alter their positions, they can establish new communication links with other vehicles and break existing ones. For example, two vehicles exceeding a threshold distance from each other may stop communicating directly.

Figure 5:
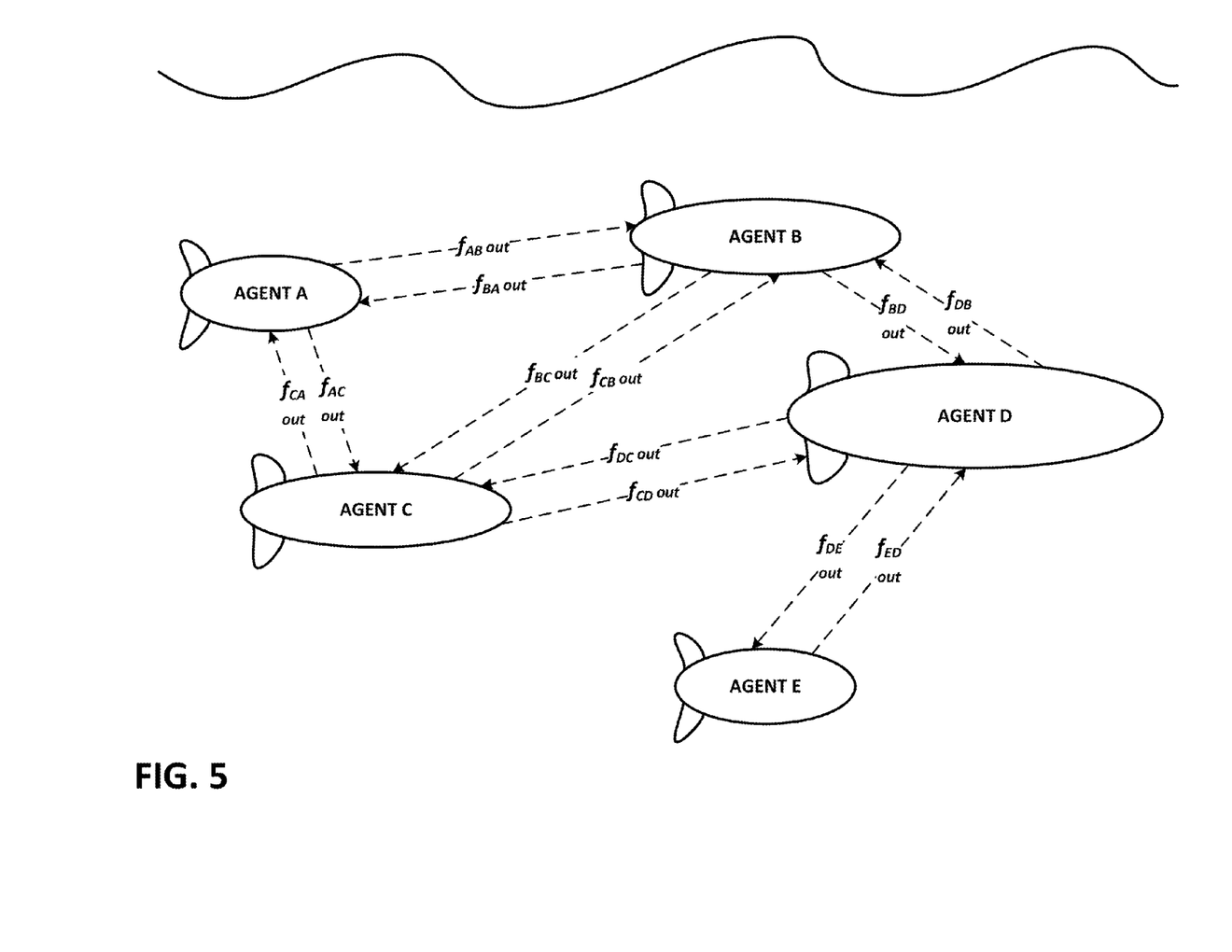
FIG. 5 depicts a group of autonomous underwater vehicles in communication according to an implementation of the present architecture.

The underwater vehicles that are in communication can provide through their communication links the output of the control function $f_{jk}(x)$. Thus, as depicted, Agent A can transmit to Agent B the output of function $f_{AB}(d_{AB}(t))$; i.e., the function applied to the difference in resource usage between Agent A and Agent B. In some instances, each agent can also observe the position (i.e., resource usage) of other agents by sonar, visual recognition, or other sensor input, and use such captured information to determine the difference in resource usage between itself and the observed agents. By placing the index j of one of the vehicles in jϵC, i.e., satisfying Eq. 7, and specifying $c_j$ as a point along a desired trajectory, the position of the swarm can be specified, as it will tend to move appropriately with respect to the position of vehicle j.

Internally, each underwater vehicle can operate in a similar manner to that shown in and described with respect to FIG. 2. Specifically, the operation of a particular underwater vehicle can be modified to use a target amount of the resource based on a subsystem $h_j$ that considers the resource usage differences between joined agents and the overall resource usage, if available. Similar techniques can be applied to groups of aircraft, terrestrial vehicles, and the like.

In another example, the present techniques can be applied to bandwidth allocation in ad hoc radio networks. In this case, the resource being allocated is channel bandwidth, with the goal being the penalization of an agent that uses a comparatively high amount of bandwidth measured with respect to the bandwidth usage of nearby agents. The overall resource usage s(t) in this case is the total bandwidth, and the function $f_0(x)$ can be used to specify a target value for total bandwidth usage.

The presented architecture has several advantages over existing systems and methods. One advantage is the inherent stability of the system. As a system constructed according to the architecture evolves in time, the cost according to Eq. 1 will be nonincreasing and will remain at a constant value when the cost reaches a local minimum. In this sense, the cost in Eq. 1 can be regarded as a Lyapunov function. This feature is particularly useful within the problem of cooperative vehicle density control, where instabilities and oscillations would result in irregular traffic patterns and associated increases in fuel consumption. The property will hold for any system constructed according to the architecture, e.g., independent of whether the functions $F_0(x)$ and $F_{jk}(x)$ are convex or nonconvex.

Another advantage of the architecture is that it is decentralized and can use local communication between joined agents. In other words, the architecture can utilize local resource difference measurements in addition to wireless communication among those agents that are joined. The measurement of the overall resource usage s(t) is a global measurement, although it can be omitted if desired by selecting $f_0(d)=0$. As previously noted, there are also many applications where s(t) is naturally available and does not need to be computed through a coordinated effort, e.g., as with total system bandwidth usage in the wireless bandwidth allocation problem. Another sense in which the architecture is decentralized is that each term $F_{jk}(x)$ in the cost function can be specified by an agent j, via the function $f_{jk}(x)$ implemented within that agent, as opposed to requiring that it is specified by a central authority.

Further, the architecture is robust, in the sense that the loss of a sensor or an error in a resource difference measurement often does not have catastrophic effects. In these situations, the behavior of the system can be characterized by considering how terms in the cost function of Eq. 1 are affected. For example, if two agents j and k use the same penalty functions in the cost function, such that $F_{jk}(x)=F_{kj}(x)$, then the system can be implemented in such a way that a detected loss of the sensor measuring a particular distance $d_{kj}(t)$ sets $f_{kj}(x)=0$, and the associated change in the cost function entry has no effect aside from a scale factor change. The general approach of setting subsets of the functions $f_{jk}(x)$ to zero can be used to realize what may be considered sub-architectures within the presented architecture.

Also, any inconsistencies in resource difference measurements can be factored into the functions $f_{jk}(x)$ and $f_{kj}(x)$, affecting terms in the cost function of Eq. 1. In this sense, measurement inconsistencies will cause the overall system to reach an equilibrium point that differs from that of a system having consistent measurements, but without resulting in overall system instabilities.

Certain implementations of the present invention are described above. It is, however, expressly noted that the present invention is not limited to those implementations, but rather the intention is that additions and modifications to what is expressly described herein are also included within the scope of the invention. Moreover, it is to be understood that the features of the various implementations described herein are not mutually exclusive and can exist in various combinations and permutations, even if such combinations or permutations are not made express herein, without departing from the spirit and scope of the invention. In fact, variations, modifications, and other implementations of what is described herein will occur to those of ordinary skill in the art without departing from the spirit and the scope of the invention. As such, the invention is not to be defined only by the preceding illustrative description, but rather by the claims.

What is claimed is:

1. A method of allocating a resource among a plurality of agents, the method comprising:
    establishing decentralized, multipoint-to-multipoint communication among a plurality of agents, each agent comprising a memory and a processor that executes instructions stored on the memory to configure the agent to use an amount of a resource;
    receiving, at a first agent in the plurality of agents, information associated with the resource usage of a second agent in the plurality of agents;
    determining, by the first agent, a difference in resource usage between the first and second agents; and
    controlling the first agent to modify its use of the resource based at least in part on the difference in resource usage between the first and second agents,
    wherein the agents comprise vehicles, aircraft, robots, networking devices, computing systems, or environmental controllers,
    wherein use of the resource by the agents locally minimizes a cost function comprising:

$$\min_{x_1,\ldots,x_N} F_0\left(\sum_{k=1}^{N} x_k\right) + \sum_{(j,k)\in\mathcal{B}} F_{jk}(x_j - x_k)$$

wherein $x_j$ is the resource usage of a particular agent j,
   wherein $x_k$ is the resource usage of a particular agent k,
   wherein N is the number of agents,
   wherein B is a set of pairs of agents (j, k) in communication with each other, and
   wherein $F_{jk}(x)$ and $F_0(x)$ are penalty functions.

2. The method of claim 1, wherein the resource is selected from the group consisting of energy consumption, temperature, pressure, and communications bandwidth.

3. The method of claim 1, wherein the multipoint-to-multipoint communication comprises wireless connections.

4. The method of claim 1, wherein each agent comprises a radio transmitter/receiver for communicating with other agents.

5. The method of claim 1, wherein the plurality of agents do not communicate globally with each other using a centralized communication channel.

6. The method of claim 1, wherein each agent is able to determine a difference in resource usage between itself and each other agent with which it communicates.

7. The method of claim 1, wherein each agent is able to determine an overall usage of the resource.

8. The method of claim 1, wherein the resource usages of one or more of the agents are subject to respective constraints.

9. The method of claim 1, wherein the information associated with the resource usage of the second agent comprises an output of a control function applied to a difference in resource usage between the second and first agents.

10. The method of claim 9, wherein the control function is a nonlinear function.

11. The method of claim 1, wherein controlling the first agent to modify its use of the resource comprises controlling the first agent, if the resource usage of the first agent is limited to a constraint, to use an amount of the resource equal to the constraint.

12. The method of claim 1, wherein controlling the first agent to modify its use of the resource comprises controlling the first agent, if the resource usage of the first agent is not limited to a constraint, to increase or decrease the amount of the resource used by the first agent.

13. The method of claim 1, further comprising communicating, by the first agent to the second agent, information associated with the resource usage of the first agent.

14. The method of claim 13, further comprising controlling the second agent to modify its use of the resource based at least in part on a difference in resource usage between the first and second agents.

15. The method of claim 1, further comprising:
receiving, at the first agent, information associated with the resource usage of a third agent in the plurality of agents;
determining, by the first agent, a difference in resource usage between the first and third agents; and
controlling the first agent to modify its use of the resource based at least in part on the difference in resource usage between the first and second agents and the difference in resource usage between the first and third agents.

16. A system for allocating a resource among a plurality of agents, the system comprising:
a plurality of agents in decentralized, multipoint-to-multipoint communication, each agent comprising (i) a memory and a processor that executes instructions stored on the memory to configure the agent to use an amount of a resource and (ii) a transmitter/receiver for communicating with other agents, wherein a first agent in the plurality of agents is configured to:
receive information associated with the resource usage of a second agent in the plurality of agents;
determine a difference in resource usage between the first and second agents; and
control the first agent to modify its use of the resource based at least in part on the difference in resource usage between the first and second agents,
wherein the agents comprise vehicles, aircraft, robots, networking devices, computing systems, or environmental controllers,
wherein use of the resource by the agents locally minimizes a cost function comprising:

$$\min_{x_1,\ldots,x_N} F_0\left(\sum_{k=1}^{N} x_k\right) + \sum_{(j,k)\in\mathcal{B}} F_{jk}(x_j - x_k)$$

wherein $x_j$ is the resource usage of a particular agent j,
wherein $x_k$ is the resource usage of a particular agent k,
wherein N is the number of agents,
wherein B is a set of pairs of agents (j, k) in communication with each other, and
wherein $F_{jk}(x)$ and $F_0(x)$ are penalty functions.

17. The system of claim 16, wherein the resource is selected from the group consisting of physical space, energy consumption, temperature, pressure, and communications bandwidth.

18. The system of claim 16, wherein the multipoint-to-multipoint communication comprises wireless connections.

19. The system of claim 16, wherein the plurality of agents do not communicate globally with each other using a centralized communication channel.

20. The system of claim 16, wherein each agent is able to determine a difference in resource usage between itself and each other agent with which it communicates.

21. The system of claim 16, wherein each agent is able to determine an overall usage of the resource.

22. The system of claim 16, wherein the resource usages of one or more of the agents are subject to respective constraints.

23. The system of claim 16, wherein the information associated with the resource usage of the second agent comprises an output of a control function applied to a difference in resource usage between the second and first agents.

24. The system of claim 23, wherein the control function is a nonlinear function.

25. The system of claim 16, wherein the first agent is configured to, if the resource usage of the first agent is limited to a constraint, use an amount of the resource equal to the constraint.

26. The system of claim 16, wherein the first agent is configured to, if the resource usage of the first agent is not limited to a constraint, increase or decrease the amount of the resource used by the first agent.

27. The system of claim 16, wherein the first agent is further configured to communicate to the second agent information associated with the resource usage of the first agent.

28. The system of claim 27, wherein the second agent is configured to modify its use of the resource based at least in part on a difference in resource usage between the first and second agents.

29. The system of claim 16, wherein the first agent is further configured to:
receive information associated with the resource usage of a third agent in the plurality of agents;
determine a difference in resource usage between the first and third agents; and
control the first agent to modify its use of the resource based at least in part on the difference in resource usage between the first and second agents and the difference in resource usage between the first and third agents.

30. The method of claim 1, wherein the resource comprises physical space.

* * * * *